United States Patent
Seo

Patent Number: 6,073,852
Date of Patent: Jun. 13, 2000

[54] DATA SYMBOL READER WITH AN OBSERVATION WINDOW

[75] Inventor: Shuzo Seo, Tokyo, Japan

[73] Assignee: Asahi Kogaku Kogyo Kabushiki Kaisha, Tokyo, Japan

[21] Appl. No.: 08/869,735

[22] Filed: Jun. 5, 1997

[30] Foreign Application Priority Data

Jun. 6, 1996 [JP] Japan .................................. 8-165138

[51] Int. Cl.[7] ........................................................ G06K 7/10
[52] U.S. Cl. ................ 235/472.01; 235/454; 235/462.43; 235/485
[58] Field of Search ......................... 235/472.01, 472.03, 235/454, 456, 485, 462.42, 462.43, 462.45; 250/566, 221, 239; 359/216

[56] References Cited

U.S. PATENT DOCUMENTS

| | | | |
|---|---|---|---|
| 3,961,198 | 6/1976 | Aungst ..................................... | 250/566 |
| 4,251,798 | 2/1981 | Swartz et al. ......................... | 235/462 X |
| 4,626,925 | 12/1986 | Toyoda .................................... | 358/285 |
| 4,800,257 | 1/1989 | Johner .................................... | 235/472 |
| 4,800,444 | 1/1989 | Suzuki et al. ............................ | 358/294 |
| 4,809,351 | 2/1989 | Abramovitz et al. ................ | 235/474 X |
| 4,847,484 | 7/1989 | Kikuchi ................................... | 250/221 |
| 5,019,918 | 5/1991 | Kubota et al. .......................... | 358/473 |
| 5,032,022 | 7/1991 | Sato et al. ................................. | 353/69 |
| 5,121,226 | 6/1992 | Kubota et al. .......................... | 358/473 |
| 5,192,856 | 3/1993 | Schaham .................................. | 235/462 |
| 5,200,598 | 4/1993 | Rencontre ............................... | 235/472 |
| 5,428,212 | 6/1995 | Tani et al. ............................... | 235/472 |
| 5,500,516 | 3/1996 | Durbin .................................... | 235/472 |
| 5,504,317 | 4/1996 | Takahashi ................................ | 235/462 |
| 5,510,607 | 4/1996 | Ishikawa .................................. | 235/472 |
| 5,514,859 | 5/1996 | Seigel ....................................... | 235/462 |
| 5,536,928 | 7/1996 | Seigel ....................................... | 235/462 |
| 5,574,272 | 11/1996 | Seo et al. ................................. | 235/454 |
| 5,576,527 | 11/1996 | Sawanobori ............................. | 235/455 |
| 5,589,678 | 12/1996 | Atsumi et al. ........................... | 235/472 |
| 5,656,803 | 8/1997 | Seo ........................................... | 235/472 |
| 5,689,104 | 11/1997 | Suzuki et al. ............................ | 235/472 |
| 5,750,977 | 5/1998 | Suzuki ..................................... | 235/472 |

FOREIGN PATENT DOCUMENTS

| | | |
|---|---|---|
| 7282180 | 10/1995 | Japan . |
| 7306907 | 11/1995 | Japan . |
| 8-7027 | 1/1996 | Japan . |

*Primary Examiner*—Michael G Lee
*Attorney, Agent, or Firm*—Greenblum & Bernstein, P.L.C.

[57] ABSTRACT

A data symbol reader for reading a data symbol formed on a reading surface which includes: a head portion which is placed on the reading surface to cover the data symbol when reading the data symbol; an image pick-up device on which an image of the data symbol is to be formed; and an image-forming optical system for leading light reflected on the data symbol to the image pick-up device to form the image of the data symbol on the image pick-up device. The head portion includes an enclosing portion for enclosing the data symbol while an open end of the enclosing portion contacts the reading surface. The enclosing portion includes a light transmissive member through which the inside of the enclosing portion is visible from the outside of the enclosing portion. The light transmissive member is inclined by a predetermined angle with respect to an optical axis of the image-forming optical system.

29 Claims, 8 Drawing Sheets

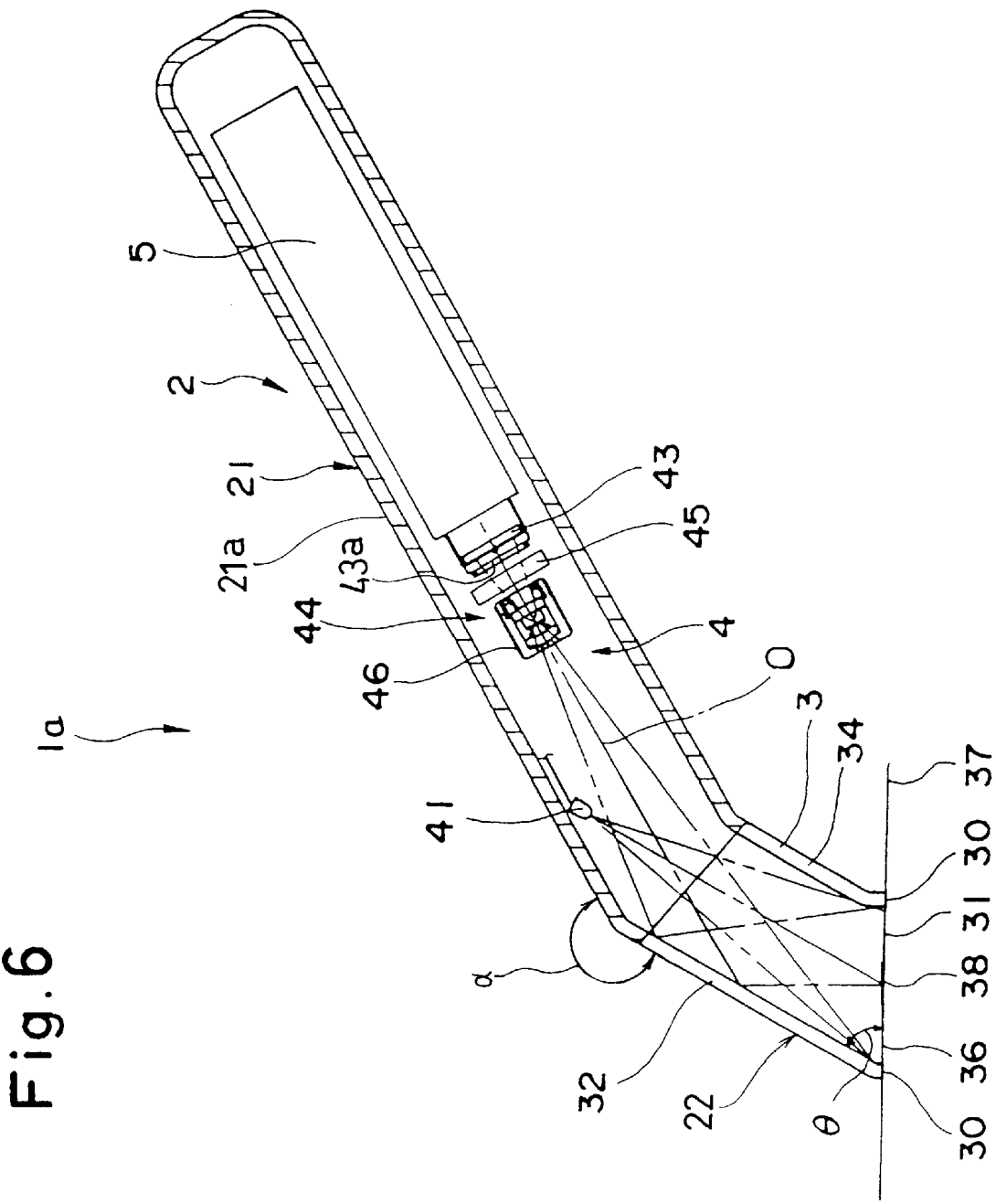

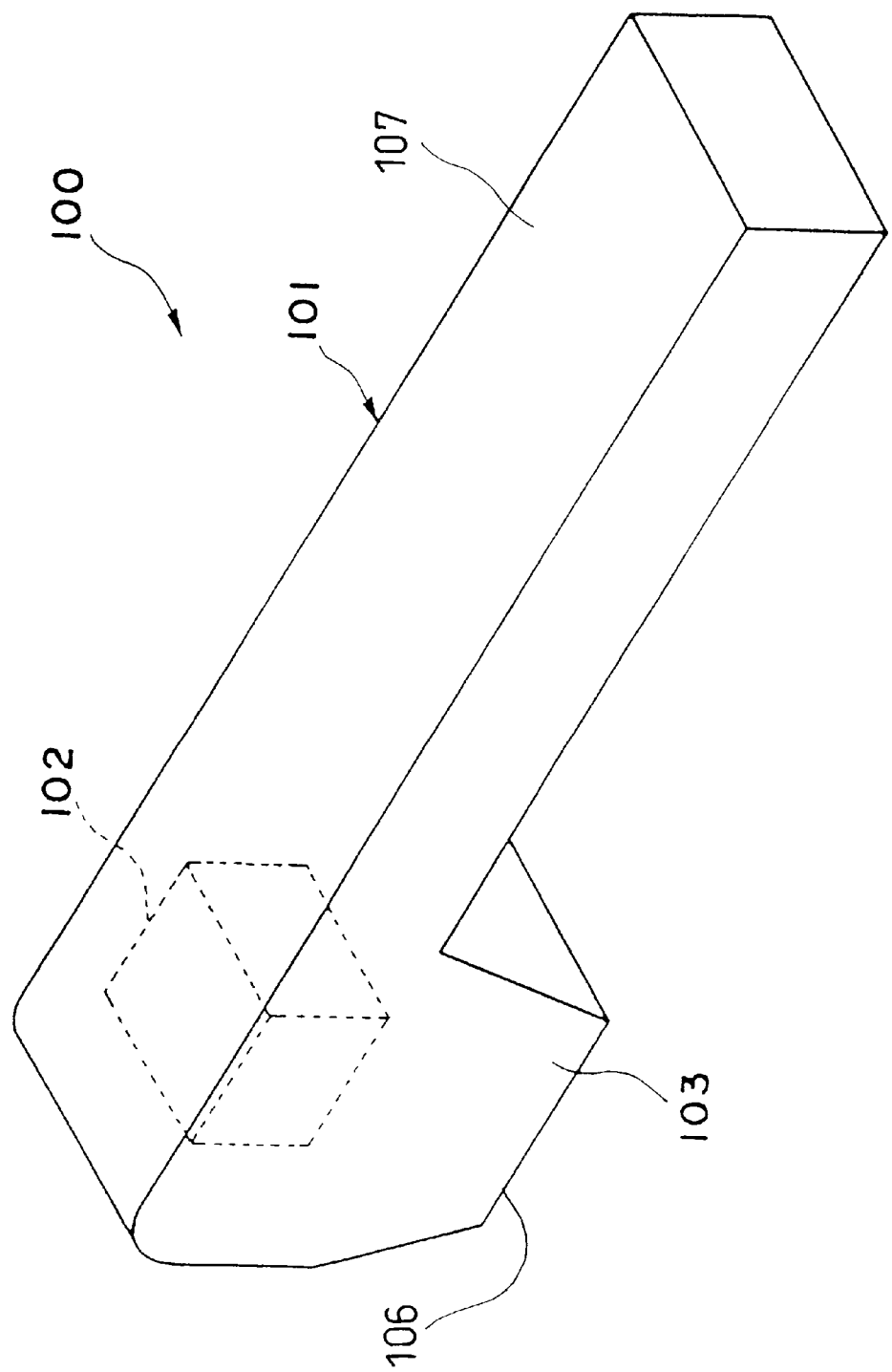

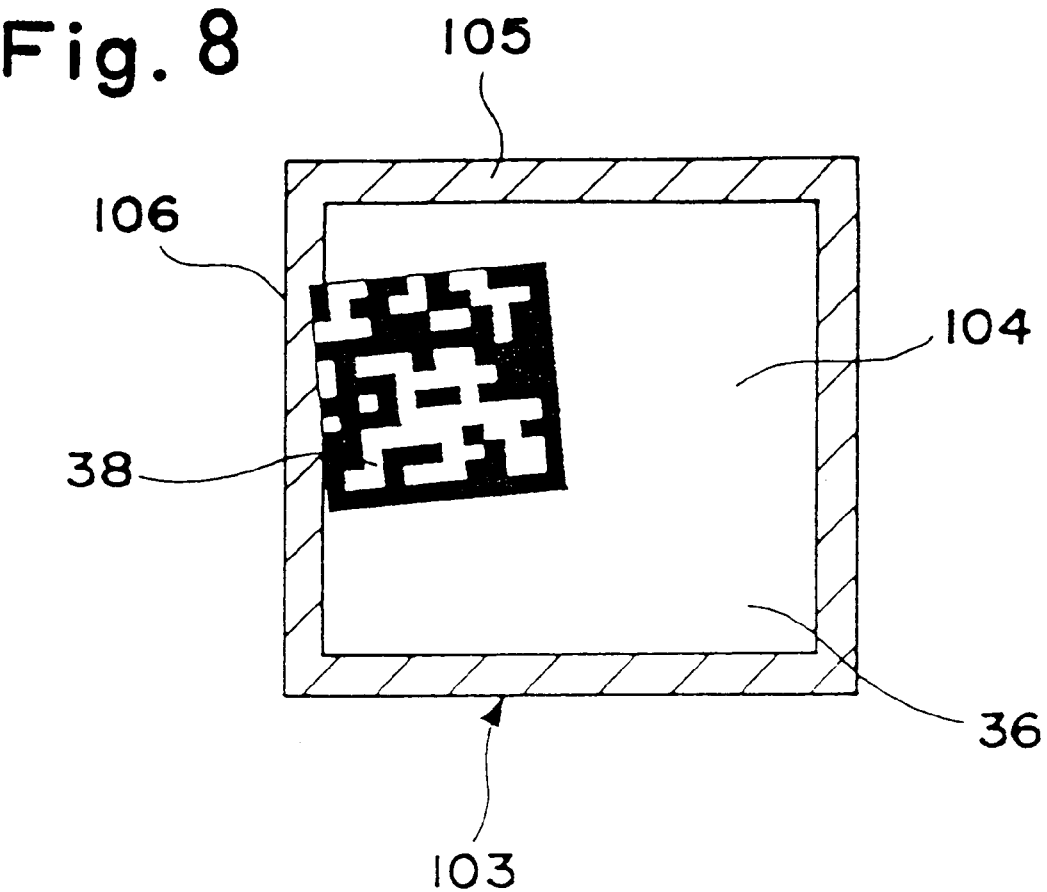

DATA SYMBOL READER WITH AN OBSERVATION WINDOW

BACKGROUND OF THE INVENTION

1. Field of the Invention

The present invention relates to a data symbol reader for reading coded data symbols, such as a bar code.

2. Description of the Related Art

In recent years, information regarding goods (e.g., the price of goods) has often been coded in the form of a bar code to be read by a bar code reader for use in a POS (point of sale) system. However, since the reading of a bar code has to be done in such a way as to scan the bar code in an arranged direction thereof one-dimensionally, a small-sized bar code cannot carry much information.

Recently a data symbol (two-dimensional data symbol) which can carry much more information than the conventional bar code, and a data symbol reader for reading such a data symbol, have been developed. One type of data symbol is formed as a black-and-white mosaic-like pattern in which black and white squares are two-dimensionally arranged.

Two types of such a data symbol reader are known. One of the types reads the pattern of a data symbol two-dimensionally at once, using an image pick-up device such as a CCD sensor (area sensor). The other type reads the pattern of a data symbol two-dimensionally by scanning the pattern line by line in a main-scanning direction while shifting the reading head in a sub-scanning direction relative to the pattern, using a line sensor.

The former type of data symbol reader, namely the one using an image pick-up device, has been receiving more attention than the latter type since the former type does not require the reading head to move relative to the data symbol to read the same. This is advantageous since the data symbol reader can read the data symbol in a short period of time.

FIG. 7 shows a conventional data symbol reader 100 using an image pick-up device, and FIG. 8 shows a condition where a reading head (head portion) 103 of the data symbol reader 100 is placed on a two-dimensional data symbol 38 for the purpose of reading the same.

As shown in FIG. 7, the data symbol reader 100 has a casing 101 which forms a general shape of the data symbol reader 100 and in which a reading device 102 including an image-pick-up device (not shown) is accommodated. The casing 101 is provided with a grip portion 107, and a head portion 103 which is formed integral with the front end of the grip portion 107. The reading device 102 is arranged in the vicinity of the head portion 103. The head portion 103 is provided at a lower end thereof with a substantially square opening 104 which determines a substantially square-shaped reading area 360 where the data symbol 38 can be read by the data symbol reader 100 when positioned therein. Accordingly, when reading the data symbol 38, it is necessary for the head portion 103 of the data symbol reader 100 to be placed on the data symbol 38 such that the data symbol 38 lies within the opening 104.

In such a positioning operation, in the case where an edge 105 of the head portion 103 covers a part of the data symbol 38 as shown in FIG. 8, the data symbol 38 cannot be properly read by the data symbol reader 100, thus resulting in a reading error.

Since the casing 101 is usually made of an opaque material it is difficult to visually check the position of the opening 104 relative to the data symbol 38 once the data symbol 38 is covered by the head portion 103. Even if it is visually checked that the data symbol 38 is not protruding from an outer edge 106 of the edge 105 of the head portion 103, a reading error will occur in the case of a condition as shown in FIG. 8.

Due to such a drawback, it is sometimes the case that the reading operation needs to be repeated, which does not efficiently utilize the above-mentioned advantage of the data symbol reader using an image pick-up device.

SUMMARY OF THE INVENTION

It is an object of the present invention to provide a data symbol reader which makes it easier, faster and also surer to read a two-dimensional data symbol and which can be made small and compact.

To achieve the object mentioned above, according to an aspect of the present invention, there is provided a data symbol reader for reading a data symbol formed on a reading surface. The data symbol reader includes a head portion which is placed on the reading surface to cover the data symbol when reading the data symbol, an image pick-up device on which an image of the data symbol is to be formed, and an image-forming optical system for leading light reflected on the data symbol to the image pick-up device to form the image of the data symbol on the image pick-up device. The head portion includes an enclosing portion for enclosing the data symbol while an open end of the enclosing portion contacts the reading surface. The enclosing portion includes a light transmissive member through which the inside of the enclosing portion is visible from the outside of the enclosing portion. The light transmissive member is inclined by a predetermined angle with respect to an optical axis of the image-forming optical system.

Preferably, the light transmissive member is made of a glass or a plastic.

Preferably, the light transmissive member selectively reflects a part of light incident thereon while allowing a remaining part of the incident light to pass therethrough.

Preferably, the light transmissive member reflects light having a wavelength inside a predetermined range while allowing another light having a wavelength outside of the predetermined range to pass through the light transmissive member.

Preferably, the light transmissive member includes an optical layer which is formed on an inner surface of the transmissive member to reflect the part of light incident thereon while allowing the remaining part of the incident light to pass therethrough. In this case, it is preferable that the optical layer reflect light having a wavelength inside a predetermined range while allowing another light having a wavelength outside of the predetermined range to pass through the optical layer.

Preferably, the light transmissive member reflects the part of light so as to serve as a part of the image-forming optical system.

Preferably, the image-forming optical system includes a converging optical system for converging the part of light received from the light transmissive member onto the image pick-up device to form the image of the data symbol on the image pick-up device.

Preferably, the enclosing portion has a substantially quadrangular shape in a cross section taken along a plane parallel to the reading surface in a state where the open end of the enclosing portion contacts the reading surface. In this case, the enclosing portion preferably includes four side walls, at least one of the four side walls including the light transmissive member. In this case, the data symbol reader preferably further includes a grip portion to which the head portion is connected to be angled relative to the grip portion, wherein one of the four side walls which is connected with an end of an upper wall of the grip portion includes the light transmissive member. Preferably, the light transmissive member is angled relative to a plane in which the open end of the enclosing portion lies by an angle in a range of about 45 to 60 degrees. An exterior angle formed between the upper wall of the grip portion and the light transmissive member is preferably in a range of about 210 to 225 degrees.

The enclosing portion may be totally made of the light transmissive member.

Preferably, the enclosing portion includes a member fixed to and along the open end of the enclosing portion for visually emphasizing an outline of a reading area determined by the open end on the reading surface.

Preferably, the data symbol reader further includes a device for emitting light to illuminate the data symbol.

Preferably, the data symbol reader further includes a device for emitting light to illuminate the data symbol, wherein the light transmissive member reflects light having a wavelength inside a predetermined range identical to that of the light emitted from the light emitting device.

Preferably, the data symbol reader further includes a filter for removing light having a wavelength outside of a predetermined range of a wavelength of the light emitted from the light emitting device. Preferably, the filter is arranged in front of the image pick-up device.

Preferably, the light emitting device emits infrared rays.

The data symbol may be of a type having a plurality of markings which are two-dimensionally arranged in a matrix.

Preferably, the light emitting device includes an LED.

Preferably, the image pick-up device includes a CCD.

According to another aspect of the present invention, there is provided a data symbol reader for reading a data symbol formed on a reading surface. The data symbol reader includes a grip portion and a head portion fixed to one end of the grip portion, wherein the head portion is placed on the reading surface so as to cover the data symbol when reading the data symbol, the head portion including an enclosing portion for enclosing the data symbol. The data symbol reader further includes a see-through window provided as a part of the enclosing portion through which the inside of the enclosing portion is visible from the outside of the enclosing portion, the see-through window being angled relative to the grip portion by a predetermined angle to be inclined to the reading surface in a state where the head portion is put on the reading surface to read the data symbol. The predetermined angle is preferably in a range of about 210 to 225 degrees. Preferably, the see-through window is angled relative to a plane in which an open end of the enclosing portion lies by an angle in a range of about 45 to 60 degrees.

Preferably, the data symbol reader further includes an image pick-up device arranged in the grip portion, and a converging optical system arranged in the grip portion between the see-through window and the image pick-up device, wherein the see-through window is angled relative to an optical axis of the converging optical system.

Preferably, the see-through window includes an optical layer fixed to an inner surface of the see-through window, the optical layer reflecting light having a wavelength inside a predetermined range, wherein the see-through window is angled relative to the optical axis of the converging optical system so as to be capable of reflecting a part of light coming from the data symbol which has the wavelength toward the converging optical system while allowing a remaining part of the light coming from the data symbol to pass through the see-through window.

The present disclosure relates to subject matter contained in Japanese Patent Application No.8-165138 (filed on Jun. 6, 1996) which is expressly incorporated herein by reference in its entirety.

BRIEF DESCRIPTION OF THE DRAWINGS

The present invention will be more clearly understood from the description as set forth below with reference to the accompanying drawings, in which similar parts are indicated by common reference numerals, and wherein:

FIG. 6 is a cross sectional view of the data symbol reader shown in FIG. 5;

FIG. 7 is a perspective view of a conventional data symbol reader; and

FIG. 8 is an explanatory view illustrating a condition where the edge of a head portion of the conventional data symbol reader shown in FIG. 7 covers a part of a data symbol to be read.

DESCRIPTION OF THE PREFERRED EMBODIMENTS

FIGS. 1 through 4 show a first embodiment of a data symbol reader to which the present invention is applied.

Figure 1:
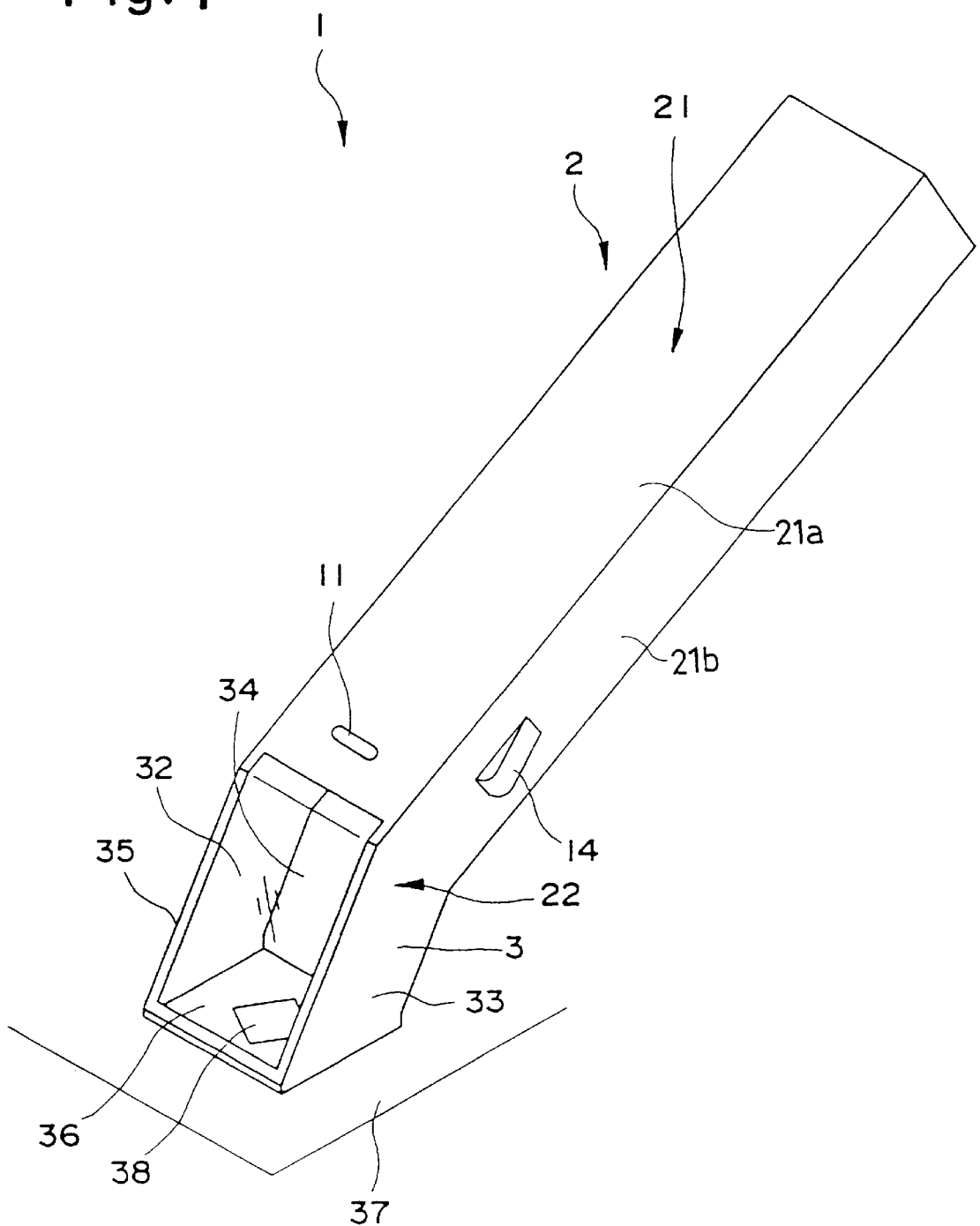
FIG. 1 is a perspective view of a first embodiment of a data symbol reader to which the present invention is applied.
Figure 2:
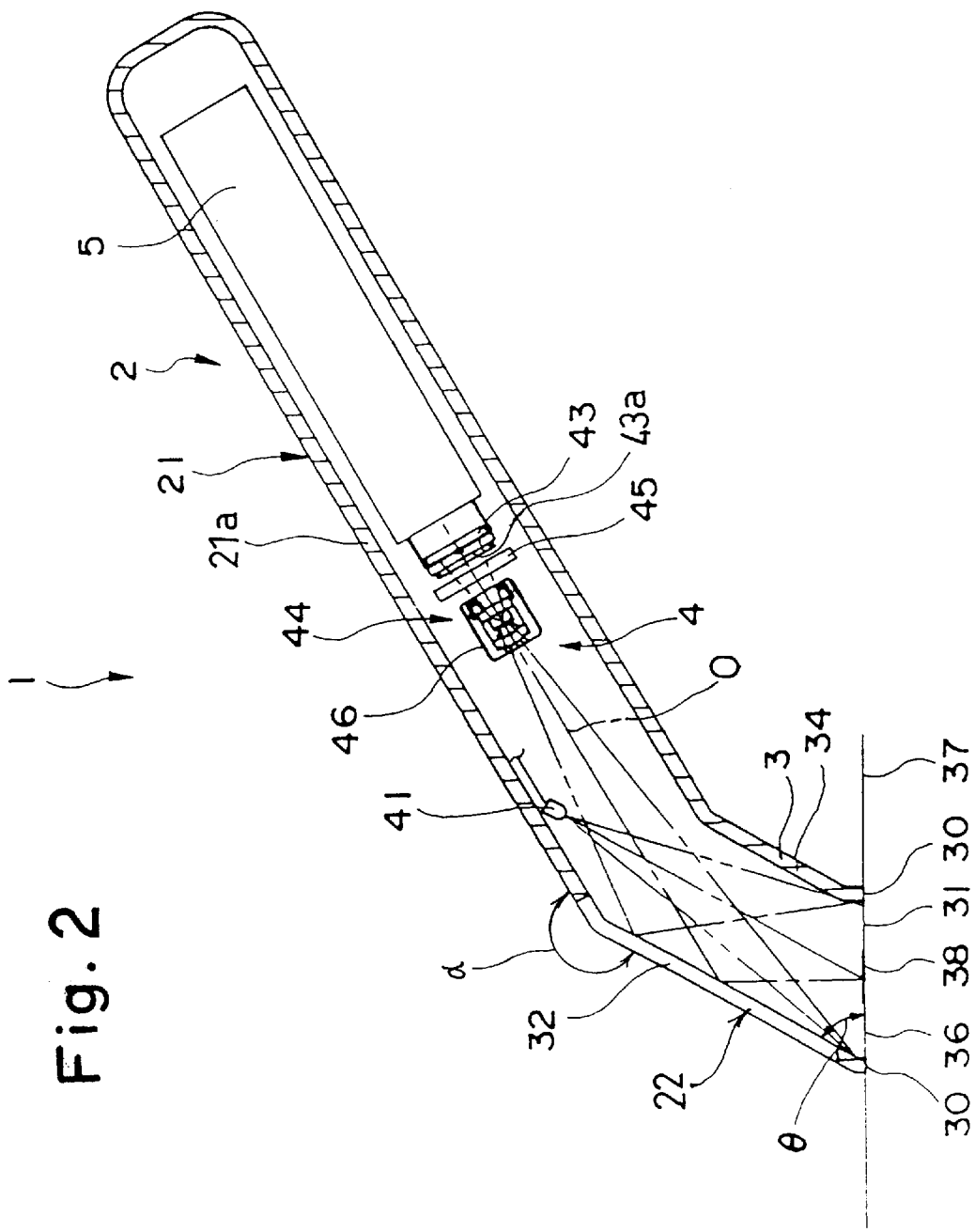
FIG. 2 is a cross sectional view of the data symbol reader shown in FIG. 1.

As shown in FIGS. 1 and 2, a data symbol reader 1 having a substantially bar shape is provided with a casing 2 having an oblong grip portion 21 and a head portion (reading head) 22 which is integrally formed with the grip portion 21. The casing 2 is bent by a predetermined angle at a position near the border between the grip portion 21 and the head portion 22.

In the casing 2, a reading device 4, a signal processing circuit 5, a light emitter drive circuit 42 (see FIG. 4) and a data communication driver 16 (see FIG. 4) are provided. The reading device 4 receives light from a substantially square-shaped reading area 36 to read a data symbol positioned inside the reading area 36. The reading area 36 is similar to the aforementioned reading area 360 shown in FIG. 8, and accordingly the data symbol 38 needs to be positioned within the reading area 36 to be read by the data symbol reader 1.

The casing 2 is provided on a side wall 21b thereof with a trigger switch 14 for actuating the reading device 4 to start a reading operation. The casing 2 is provided on an upper wall 21a thereof with an OK/NG (no good) indicator 11 composed of a light-emitter such as an LED.

The reading device 4 consists of a light emitter (illuminating device) 41 for illuminating the reading area 36, a CCD (charged coupled device) 43 which serves as an image pick-up device, an optical system (image-forming optical system) 44 for leading light reflected on the reading area 36 to a light receiving surface 43a of the CCD 43 so as to form an image thereon, and some supporting members (not shown) for supporting the members 41, 43 and 44.

The optical system 44 is composed of a front side wall (optical member) 32, a converging lens group (converging optical system) 46 and a filter 45. The converging lens group 46 receives light which is reflected on an inner surface of the front side wall 32, after being reflected on the reading area 36, to form an image on the light receiving surface 43a of the CCD 43. The filter 45 removes light having a wavelength outside of a predetermined range of the wavelength of light emitted from the light emitter 41. The filter 45 is arranged in front of the CCD 43, namely, between the converging lens group 46 and the CCD 43.

The light emitter 41 is positioned inside the grip portion 21 in the vicinity of the front end thereof, immediately below the upper wall 21a. The light emitter 41 consists of two LEDs (see FIG. 4) each emitting infrared light (infrared rays). The light emitter 41 may consist of a single LED or any other light emitting device other than an LED as long as it emits infrared light.

A diffusion plate (not shown) which defuses light emitted from the light emitter 41 may be placed in front of the light emitter 41 so as to uniformly illuminate the reading area 36. The light emitter 41 is electrically connected to the aforementioned light emitter drive circuit 42 for the purpose of controlling the light emitter 41.

The CCD 43 is provided with a large number of photo-diodes arranged in a matrix. Each diode accumulates a certain amount of electric charge according to the quantity of light received and subsequently forwards the accumulated electric charge one by one at a prescribed time. The forwarded electric charges are converted into image signals of an image having been read by the CCD 43.

The reading area 36 is designated on a reading surface 37 on which the data symbol 38 is formed when the head portion 22 is placed on the reading surface 37. The reading surface 37 is, e.g., a surface of a piece of paper. The reading area 36 is illuminated by the light emitter 41. The CCD 43 receives light reflected by the reading area 36. In the case where the data symbol 38 is properly positioned inside the reading area 36, the CCD 43 can receive that light reflected by the reading area 36 which includes an image of the data symbol 38 to read the information contained in the data symbol 38. The reading area 36 substantially corresponds to an end opening 31 formed at the edge of the head portion 22.

Figure 3:
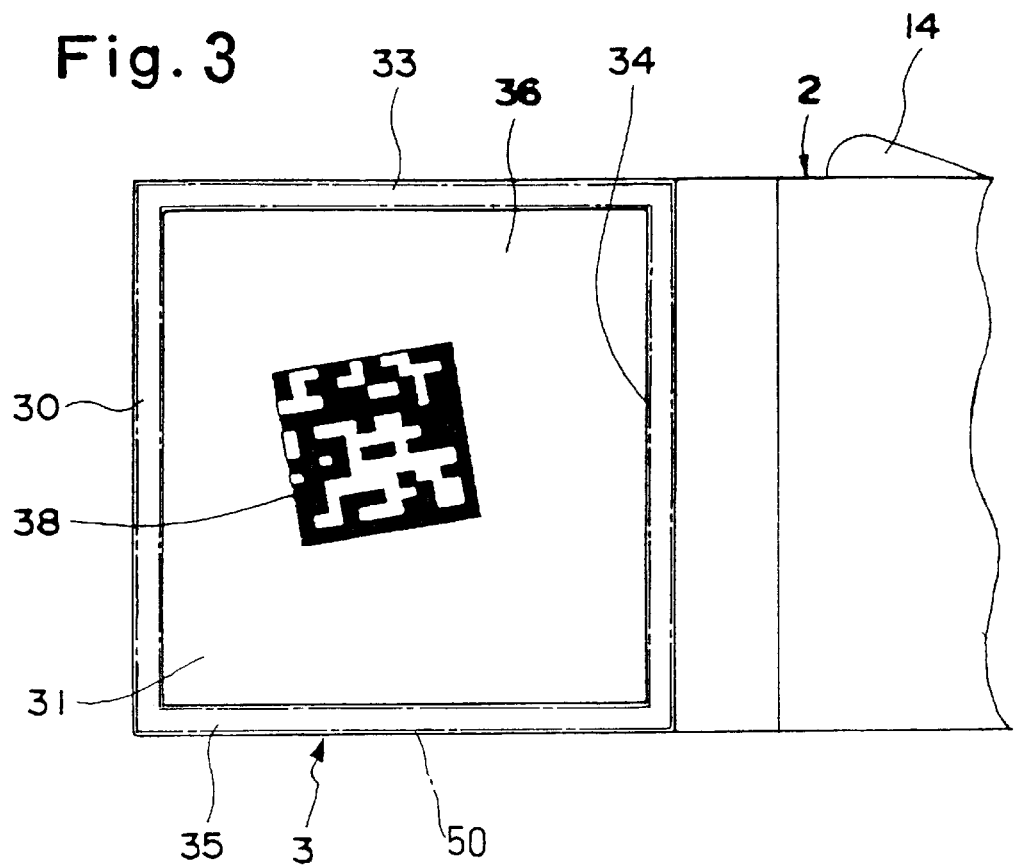
FIG. 3 is a bottom view of a head portion of the data symbol reader shown in FIG. 1, as viewed from the bottom in FIG. 2.
Figure 4:
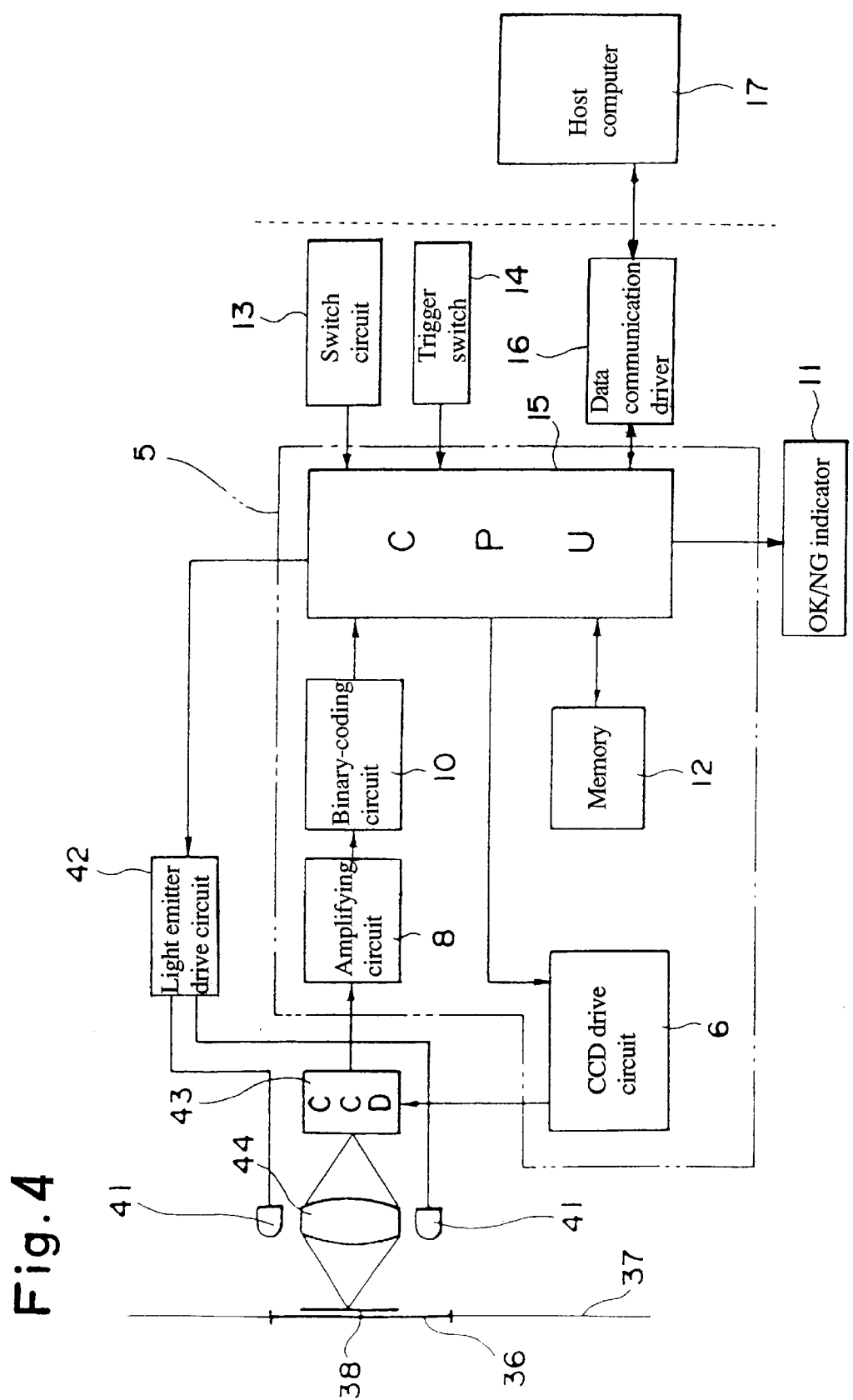
FIG. 4 is a block diagram of an overall circuit provided in the data symbol reader shown in FIG. 1.

As shown in FIG. 3, the data symbol 38 read by the data symbol reader 1 is in the form of a black and white square mosaic where small black and white squares are arranged in a matrix, i.e., in X lines and Y rows (X and Y are integral numbers more than 1). Each of the black or white squares of the data symbol 38 represents, for example, 0 or 1 in the binary system, and a certain combination of the black and white squares represents specific information. The composition of the data symbol 38 is not limited solely to the one shown in FIG. 3.

As shown in FIGS. 1 and 2, the head portion 22 of the casing 2 is provided with an enclosing portion or enclosure 3 consisting of the aforementioned front side wall 32, a left side wall 33 formed integral with the side wall 21b, a rear side wall 34 and a right side wall 35 arranged opposite to the left side wall 33. A cross section of the enclosing portion 3 taken along a plane parallel to the reading surface 37 has a substantially square shape (i.e., quadrangular shape).

The front side wall 32 is connected with the front end of the upper wall 21a to be positioned substantially at the frontmost of the data symbol reader 1 such that the front side wall 32 is substantially inclined to the upper wall 21a towards the side of the grip portion 21 (towards the right side as viewed in FIG. 2). An exterior angle α (see FIG. 2) formed between the front side wall 32 and the upper wall 21a exceeds 180 degrees, and is 210 degrees in this particular embodiment. The exterior angle ae is preferably in the range of about 210 to 225 degrees. The front side wall 32 is made of a transparent material (light transmissive member) such as a transparent glass or a transparent plastic (e.g., acrylic resin) so that the data symbol 38 can be-seen through the front side wall 32. The front side wall 32 has a function to selectively reflect a part of light reflected by the reading area 36 to the converging lens group 46.

Namely, the front side wall 32 is provided on the inner surface thereof with an optical thin film or coating (not shown) which serves as an optical layer which reflects light having a wavelength inside a predetermined range identical to that of the light emitted from the light emitter 41. That is, the thin film or coating selectively reflects infrared rays. Accordingly, it will be appreciated that the front side wall 32 reflects infrared light while allowing the data symbol 38 positioned in the reading area 36 to be seen through the front side wall 32. Although the front side wall 32 is made of a transparent material in this particular embodiment, the front side wall 32 may be made of a translucent material as long as the front side wall 32 allows the reading area 36 to be seen therethrough.

As shown in FIG. 2, the front side wall 32 is angled relative to an optical axis O of the optical system 44 (i.e., optical axis of the converging lens group 46) by a predetermined angle. Namely, the front side wall 32 is arranged to be inclined to the reading surface 37 by a predetermined angle θ in a state where an open end of the enclosing portion 3 (i.e., the edge of the head portion 22) contacts the reading surface 37 as shown in FIG. 2. In such a state, the angle θ is determined such that the light from the reading area 36 is reflected by the inner surface of the front side wall 32 to be incident on the converging lens group 46. Specifically, the angle θ is preferably in the range of about 45 to 60 degrees. It should be noted that the angle θ depends on the position of the optical axis of the converging lens group 46.

Due to the aforementioned arrangement of the front side wall 32, the reading area 36 can be seen through the front side wall 32 from different angles, e.g., from the front of the data symbol reader 1 (from the left side as viewed in FIG. 2), from the front top of the data symbol reader 1 (from the left side top as viewed in FIG. 2), and from the top of the data symbol reader 1 (from the top as viewed in FIG. 2).

The enclosing portion 3 maintains the reading device 4 to be apart from the reading area 36 by a predetermined distance (optical path length) when the open end of the enclosing portion 3 is put on the reading surface 37. Accordingly, the enclosing portion 3 functions as a guide member which determines a distance between the data symbol 38 inside the reading area 36 and the light receiving surface 43a of the CCD 43. Due to the determined distance a sharp image of the data symbol 38 is formed on the light receiving surface 43a of the CCD 43. Therefore, the length of the enclosing portion 3 is predetermined such that the light from the reading area 36 is focused on the light receiving surface 43a of the CCD 43 through the optical system 44 in a state where the open end of the enclosing portion 3 contacts the reading surface 37 as shown in FIG. 2.

The aforementioned end opening 31 having a substantially square shape is formed at the open end of the enclosing portion 3. As shown in FIG. 3, the edge (end surface) 30 of the enclosing portion 3 determines the outline of the reading area 36.

When the data symbol reader 1 is used to read the data symbol 38, the user of the data symbol reader 1 generally holds the grip portion 21, and subsequently puts the edge 30 of the enclosing portion 3 onto the reading surface 37 so as to position the data symbol 38 within the end opening 31.

In such a positioning operation, the user slides the end opening 31 on the reading surface 37 to adjust the position of the end opening 31 relative to the data symbol 38 so as to properly position the data symbol 38 within the end opening 31 while looking at the data symbol 38 through the front side wall 32.

When the data symbol 38 is properly positioned within the end opening 31, i.e., within the reading area 36, a depression of the trigger switch 14, i.e., turning the trigger switch 14 ON, makes the data symbol reader 1 start its reading operation to read the data symbol 38.

Upon the commencement of the reading operation, by the operation of the light emitter drive circuit 42 the light emitter 41 emits light (infrared light) to the reading area 36, and the light reflected by the reading area 36 is again reflected by the inner surface of the front side wall 32 to be incident on the converging lens group 46. The light incident on the converging lens group 46 is focused on the light receiving surface 43a of the CCD 43 to form an image thereon through the converging lens group 46. According to the amount of light received, the CCD 43 generates image signals (analogue signals).

Of the light reflected by the reading area 36, the visible rays or light passes through the front side wall 32, so that the reading area 36 can be seen through the front side wall 32.

The aforementioned signal processing circuit 5 is electrically connected to the CCD 43 to receive the image signals output therefrom so as to process the received image signals. The signal processing circuit 5 is mounted on a printed circuit board (not shown) for example.

The signal processing circuit 5 is composed of mainly a CCD drive circuit 6, an amplifying circuit 8, a binary-coding circuit 10, a memory 12, a controller (CPU) 15 and electrical lines connecting these devices.

Connected with the controller 15 are the light emitter drive circuit 42, the OK/NG indicator 11, the data communication driver 16, the trigger switch 14 and a switch circuit 13 such as a power switch (not shown). An LCD panel, a CRT or the like may be connected to the controller 15, if necessary.

It will be hereinafter discussed how the data symbol reader 1 works.

As mentioned above, upon turning the trigger switch 14 ON the reading operation starts, so that the CCD 43 generates image signals to output the same to the signal processing circuit 5. In the signal processing circuit 5 a predetermined signal processing operation is performed. The image signals processed by the signal processing circuit 5 are converted to image data, and this image data is input to a host computer 17 through the data communication driver 16. The host computer 17 is, for instance, a personal computer or a workstation which is provided separately from the data symbol reader 1 and to which the data communication driver 16 is connected. The host computer 17 stores the data input from the data symbol reader 1, decodes the same, totals the decoded data, or carries out other operations when necessary.

The light emitter drive circuit 42 is controlled by the controller 15 to supply electrical power to the light emitter 41 to light the same. In response to the trigger switch 14 being half-depressed, the controller 15 controls the light emitter drive circuit 42 to start the light emitter 41 emitting light. The controller 15 controls the light emitter drive circuit 42 such that the light emitter 41 keeps emitting light as long as the trigger switch 14 is held half-depressed, and the controller 15 controls the light emitter drive circuit 42 to stop the light emitter 41 emitting light when the trigger switch 14 recovers its free state (non-depressed state).

When the trigger switch 14 is fully depressed, the controller 15 controls the light emitter drive circuit 42 to continue the light emitter 41 emitting light, and at the same time the controller 15 controls the CCD drive circuit 6 to start operating. The CCD drive circuit 6 outputs CCD horizontal drive pulses and CCD vertical drive pulses to control the accumulation and forwarding operations performed in the CCD 43.

The CCD drive circuit 6 generates clock signals to be combined with horizontal and vertical synchronizing signals and outputs these combined signals (composite clock signals) to the controller 15.

The image signals (analogue signals) output from the CCD 43 are amplified by the amplifying circuit 8. Subsequently, the amplified analogue image signals are converted to digital image signals by an A/D converter (not shown) to be input to the binary-coding circuit 10.

The binary-coding circuit 10 codes the input digital image signals to be binary data through a predetermined operation where the input digital image signals are compared with a threshold value. Due to a command from an address counter (not shown) provided in the controller 15, the binary data output from the binary-coding circuit 10 is stored in a predetermined address in the memory 12. The address counter is actuated in accordance with the aforementioned composite clock signals input from the CCD drive circuit 6.

The controller 15 reads out the binary data from the memory 12 by turns (there is a case where the reading order is opposite as compared with that of when binary data is stored in the memory 12) in accordance with the address designated in the aforementioned address counter. Subsequently, the controller 15 performs, in a processing section thereof, an image processing operation in which an image reversing operation, an image outline detecting operation in which only the data regarding the data symbol 38 is extracted from the read binary data, a dropout compensating operation, an image rotating operation, etc. are performed. Furthermore, the controller 15 decodes, in a decoding section thereof, the extracted data regarding the data symbol 38 to obtain desired data or information therefrom.

Upon having completed such a decoding operation, the controller 15 controls the light emitter drive circuit 42 to stop the light emitter 41 emitting light, and at the same time the controller 15 checks whether or not appropriate data has been obtained as a result of the decoding operation. In the case where appropriate data has been obtained, the controller 15 controls the OK/NG indicator 11 to emit light in such a way that the user of the data symbol reader 1 can recognize that the reading operation has been properly completed. Conversely, if appropriate data has not been obtained, the controller 15 controls the OK/NG indicator 11 to emit light in such a way that the user of the data symbol reader 1 can recognize that the reading operation has failed. In practice, the OK/NG indicator 11 may be provided with a blue LED and a red LED, and the controller 15 may control the OK/NG indicator 11 to emit blue light for a predetermined period of time when the reading operation has been successful or to emit red light for a predetermined period of time if the reading operation is a failure. The controller 15 outputs the decoded data obtained to the host computer 17 through the data communication driver 16.

As can be understood from the foregoing, according to the data symbol reader 1 to which the present invention is applied, the reading area 36 in which the data symbol 38 is to be positioned can be seen through the front side wall 32 fixed to the head portion 22 of the data symbol reader 1. This makes it possible to adjust the position of the edge 30 of the enclosing portion 3 relative to the data symbol 38 while seeing the same precisely and promptly so as to prevent a reading error from occurring.

Furthermore, since the front side wall 32 is arranged to be inclined to the reading surface 37 by a predetermined angle θ in a state where the edge 30 of the enclosing portion 3 contacts the reading surface 37 as shown in FIG. 2, the reading area 36 can be seen through the front side wall 32 from various different angles in a wide range.

With such an inclined arrangement of the front side wall 32, the position of the data symbol 38 relative to the end opening 31 can be easily checked from the outside of the data symbol reader 1, which contributes to realizing a speedy and easy operation of the data symbol reader 1.

In the data symbol reader 1, unnecessary ambient light does not reach the CCD 43 through the front side wall 32 owing to the characteristics of the aforementioned optical thin film or coating provided on the front side wall 32. The front side wall 32 selectively reflects infrared light, so that the infrared light included in the ambient light which is incident on the front side wall 32 reflects on the front side wall 32 and thus does not enter the enclosing portion 3. The remaining light other than the infrared light in the ambient light enters the enclosing portion 3 through the front side wall 32, but subsequently a majority of the entered light goes out of the enclosing portion 3 through the front side wall 32 after being reflected on the reading area 36. Even when a part of the entered ambient light proceeds to the converging lens group 46, the light is removed by the filter 45, so that no unnecessary light reaches the CCD 43. This prevents a reading error from occurring and thus ensures a precise reading operation.

In the data symbol reader 1, the front side wall 32 serves not only as a see-through window but also as a reflector which reflects light from the reading area 36 to the converging lens group 46, so that a separate reflector does not have to be disposed in addition to the front side wall 32. This contributes to making the head portion 22 small and compact and therefore contributes to the downsizing of the data symbol reader 1.

Figure 5:
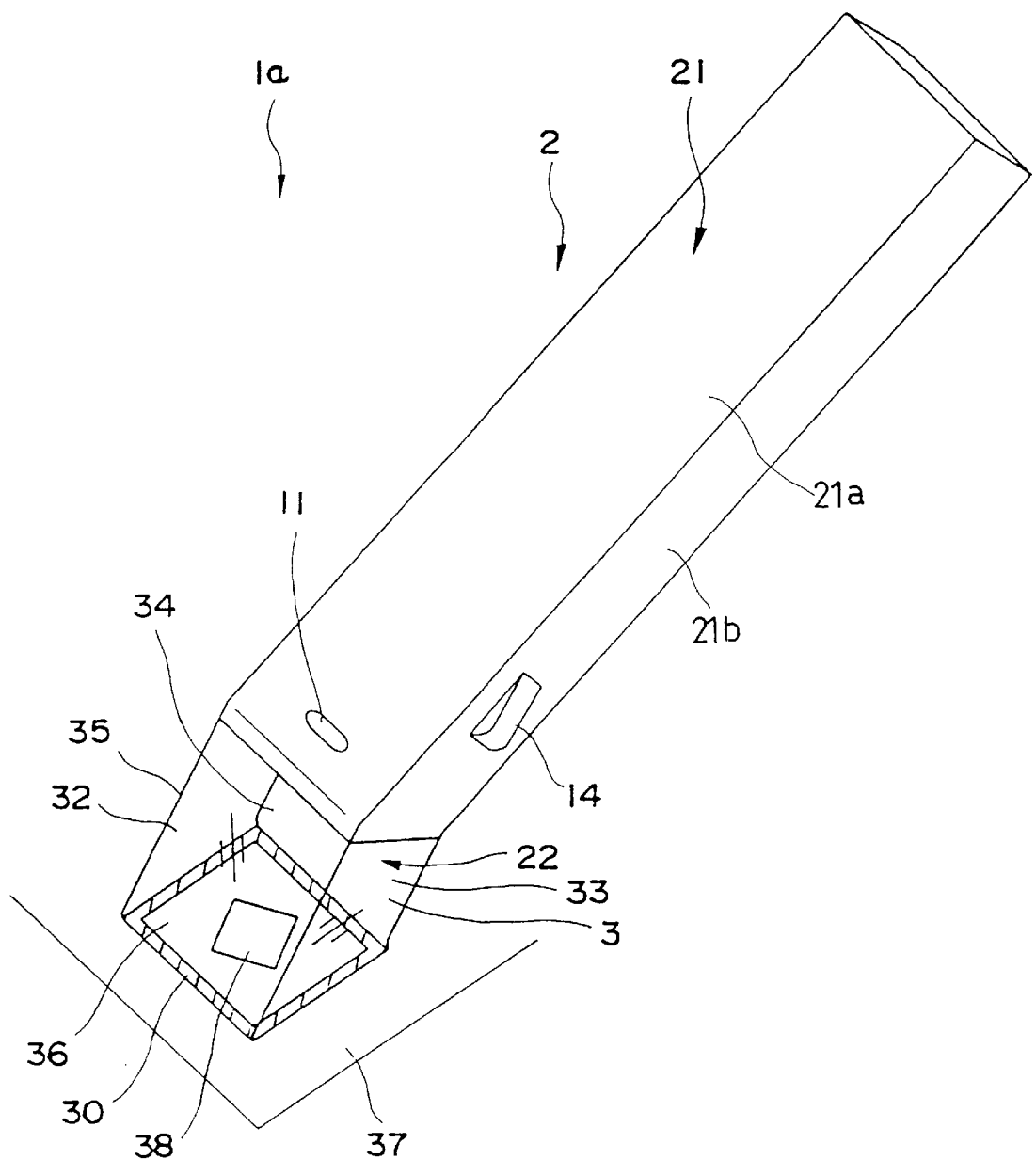
FIG. 5 is a perspective view of a second embodiment of a data symbol reader to which the present invention is applied.

FIGS. 5 and 6 show a second embodiment of a data symbol reader to which the present invention is applied. Since this data symbol reader 1a is similar to the first embodiment of the data symbol reader 1 in many respects, only those aspects unique to the second embodiment will be hereinafter discussed.

In the second embodiment, the enclosing portion 3 is made entirely of the same transparent material (or translucent material) as that used for making the front side wall 32 of the first embodiment. Namely, the front side wall 32, the left side wall 33, the rear side wall 34 and the right side wall 35 are each made of a common transparent material (or translucent material), and each wall 32, 33, 34 or 35 is provided on the inner surface thereof with the aforementioned optical thin film or coating (not shown) which reflects infrared light.

In addition, the edge (end surface) 30 of the enclosing portion 3 is colored in a visible color, e.g., red, black, etc., which makes it easier to appropriately position the edge 30 relative to the data symbol 38 to be read.

According to the second embodiment of the data symbol reader 1a, effects or merits similar to those of the data symbol reader 1 can be expected. Namely, the position of the edge 30 of the enclosing portion 3 can be easily adjusted relative to the data symbol 38 while seeing the same precisely and promptly so as to prevent a reading error from occurring, similar to the first embodiment of the data symbol reader 1. Furthermore, since the enclosing portion 3 is completely transparent or translucent, the reading area 36 can be much more easily and widely seen from outside the enclosing portion 3 from various different angles as compared with the data symbol reader 1, which contributes to realizing a more speedy and easier operation of the data symbol reader 1.

Moreover, according to the data symbol reader 1a, since the aforementioned optical thin film or coating which reflects infrared light is fixed on the inner surface of each of the walls 32, 33, 34 and 35, i.e., on the entire inner surface of the enclosing portion 3, a loss of light emitted from the light emitter 41 due to the inner surface of the enclosing portion 3 is reduced, so that the reading operation can be more accurately carried out.

In the second embodiment, although each side wall 32, 33, 34 and 35 is provided on the inner surface thereof with the aforementioned optical thin film or coating which reflects infrared light, it is not necessary to provide each of the right, left and rear side walls 33, 34 and 35 with the optical thin film or coating. Namely, each of the right, left and rear side walls 33, 34 and 35 may be a mere transparent or translucent member.

In either the first or second embodiment, an outline emphasizing member 50 (shown by one-dotted lines in FIG. 3) for visually emphasizing the outline of the reading area 36 may be fixed along the edge 30 of the enclosing portion 3. The outline emphasizing member 50 may be made of plush, or an elastic or resilient member such as rubber or the like.

The light emitter 41 in either the first or second embodiment may be of a type which emits visible light, e.g., red light having a center wavelength of about 660 nm.

The front side wall 32 in either the first or second embodiment may be made to partly reflect light, which is emitted from the light emitter 41 to be incident on the reading area 36, toward the converging lens group 46 while allowing the remaining part of light to pass through the front side wall 32 outwardly. In this case, the inner reflecting surface of the front side wall 32 needs to have a sufficient reflectivity to reflect light of a sufficient amount towards the converging lens group 46 for the CCD 43 to properly pick up an image of the data symbol 38.

Obvious changes may be made in the specific embodiments of the present invention described herein, such modifications being within the spirit and scope of the invention claimed. It should be understood that all matter contained herein is illustrative and does not limit the scope of the present invention.

What is claimed is:

1. A data symbol reader for reading a data symbol formed on a reading surface, comprising:
   a head portion which is positionable on the reading surface to cover said data symbol when reading said data symbol;
   an image pick-up device on which an image of said data symbol is to be formed; and an image-forming optical system that directs light reflected from said data symbol to said image pick-up device to form said image of said data symbol on said image pick-up device;

wherein said head portion comprises an enclosing portion that encloses said data symbol while an open end of said enclosing portion contacts said reading surface, said enclosing portion comprising a light transmissive member through which an inside of said enclosing portion is visible from an outside of said enclosing portion, said enclosing portion comprising a member fixed to and extending along said open end of said enclosing portion for visually emphasizing an outline of a reading area determined by said open end on said reading surface, and wherein said light transmissive member is inclined by a predetermined angle with respect to an optical axis of said image forming optical system.

2. The data symbol reader according to claim 1, wherein said light transmissive member is made of a glass.

3. The data symbol reader according to claim 1, wherein said light transmissive member is made of a plastic.

4. The data symbol reader according to claim 1, wherein said light transmissive member selectively reflects a part of light incident thereon while allowing a remaining part of said incident light to pass therethrough.

5. The data symbol reader according to claim 4, wherein said light transmissive member reflects light having a wavelength inside a predetermined range while allowing another light having a wavelength outside of said predetermined range to pass through said light transmissive member.

6. The data symbol reader according to claim 4, wherein said light transmissive member comprises an optical layer which is formed on an inner surface of said transmissive member to reflect said part of light incident thereon while allowing said remaining part of said incident light to pass therethrough.

7. The data symbol reader according to claim 6, wherein said optical layer reflects light having a wavelength inside a predetermined range while allowing another light having a wavelength outside of said predetermined range to pass through said optical layer.

8. The data symbol reader according to claim 4, wherein said light transmissive member reflects said part of light so as to serve as a part of said image-forming optical system.

9. The data symbol reader according to claim 8, wherein said image-forming optical system comprises a converging optical system for converging said part of light received from said light transmissive member onto said image pick-up device to form said image of said data symbol on said image pick-up device.

10. The data symbol reader according to claim 4, further comprising means for emitting light to illuminate said data symbol, wherein said light transmissive member reflects light having a wavelength inside a predetermined range identical to that of said light emitted from said light emitting means.

11. The data symbol reader according to claim 10, further comprising a filter for removing light having a wavelength outside of a predetermined range of a wavelength of said light emitted from said light emitting means.

12. The data symbol reader according to claim 11, wherein said filter is arranged in front of said image pickup device.

13. The data symbol reader according to claim 10, wherein said light emitting means emits infrared rays.

14. The data symbol reader according to claim 10, wherein said light emitting means comprises an light emitting diode (LED).

15. The data symbol reader according to claim 1, wherein said enclosing portion has a substantially quadrangular shape in a cross section taken along a plane parallel to said reading surface in a state where said open end of said enclosing portion contacts said reading surface.

16. The data symbol reader according to claim 15, wherein said enclosing portion comprises four side walls, at least one of said four side walls comprising said light transmissive member.

17. The data symbol reader according to claim 16, further comprising a grip portion to which said head portion is connected to be angled relative to said grip portion, wherein one of said four side walls which is connected with an end of an upper wall of said grip portion comprises said light transmissive member.

18. The data symbol reader according to claim 17, wherein said light transmissive member is angled relative to a plane in which said open end of said enclosing portion lies by an angle in a range of about 45 to 60 degrees.

19. The data symbol reader according to claim 17, wherein an exterior angle formed between said upper wall of said grip portion and said light transmissive member is in a range of about 210 to 225 degrees.

20. The data symbol reader according to claim 1, wherein said enclosing portion is totally made of said light transmissive member.

21. The data symbol reader according to claim 1, further comprising means for emitting light to illuminate said data symbol.

22. The data symbol reader according to claim 1, wherein said data symbol is of a type having a plurality of markings which are two-dimensionally arranged in a matrix.

23. The data symbol reader according to claim 1, wherein said image pick-up device comprises a charge coupled device (CCD).

24. A data symbol reader for reading a data symbol formed on a reading surface, comprising:

a grip portion and a head portion fixed to one end of said grip portion, wherein said head portion is positionable on said reading surface so as to cover said data symbol when reading said data symbol, said head portion comprising an enclosing portion for enclosing said data symbol; and a see-through window provided as a part of said enclosing portion through which an inside of said enclosing portion is visible from an outside of said enclosing portion, said see-through window being angled relative to said grip portion by a predetermined angle to be inclined to said reading surface in a state where said head portion is placed on said reading surface to read said data symbol, said enclosing portion comprising a member fixed to and extending along an open end of said enclosing portion for visually emphasizing an outline of a reading area determined by said open portion on said reading surface.

25. The data symbol reader according to claim 24, wherein said predetermined angle is in a range of about 210 to 225 degrees.

26. The data symbol reader according to claim 24, wherein said see-through window is angled relative to a plane in which an open end of said enclosing portion lies by an angle in a range of about 45 to 60 degrees.

27. The data symbol reader according to claim 24, further comprising;

an image pick-up device arranged in said grip portion; and a converging optical system arranged in said grip portion between said see-through window and said image pick-up device, wherein said see-through window is angled relative to an optical axis of said converging optical system.

28. The data symbol reader according to claim 27, wherein said see-through window comprises an optical layer fixed to an inner surface of said see-through window, said optical layer reflecting light having a wavelength inside a predetermined range, wherein said see-through window is angled relative to said optical axis of said converging optical system so as to be capable of reflecting a part of light coming from said data symbol which has said wavelength toward said converging optical system while allowing a remaining part of said light coming from said data symbol to pass through said see-through window.

29. The data symbol reader according to claim 27, said enclosing portion is made entirely of a light transmissive member.

* * * * *